US007814659B2

(12) United States Patent
Matsuda et al.

(10) Patent No.: US 7,814,659 B2
(45) Date of Patent: Oct. 19, 2010

(54) METHOD OF MANUFACTURING FLUID DYNAMIC BEARING ASSEMBLY

(75) Inventors: Tatsuo Matsuda, Nagano (JP); Shoji Kubota, Nagano (JP)

(73) Assignee: Nidec Corporation, Kyoto (JP)

( * ) Notice: Subject to any disclaimer, the term of this patent is extended or adjusted under 35 U.S.C. 154(b) by 1147 days.

(21) Appl. No.: 11/382,933

(22) Filed: May 12, 2006

(65) Prior Publication Data

US 2007/0261248 A1 Nov. 15, 2007

(51) Int. Cl.
*B21K 1/10* (2006.01)

(52) U.S. Cl. ................... 29/898.02; 29/898; 29/898.07; 29/464; 29/468

(58) Field of Classification Search ................... 29/898, 29/898.02, 898.04, 898.041, 898.042, 898.054, 29/898.07, 464, 468, 469
See application file for complete search history.

(56) References Cited

U.S. PATENT DOCUMENTS 5,829,134 A * 11/1998 Johnson et al. ........ 29/890.124
6,890,104 B2 5/2005 Gomyo et al.
6,939,047 B2 9/2005 Gomyo et al.
7,458,156 B2 * 12/2008 Beggs et al. ........... 29/890.124
2005/0060875 A1 3/2005 Etling et al.

FOREIGN PATENT DOCUMENTS

JP S63-007237 A 1/1988
JP H01-306135 A 12/1989
JP 2000-163860 6/2000
JP 2002-221684 8/2002
JP 2004270843 A * 9/2004
JP 2004-340760 12/2004
JP 2004-358642 A 12/2004

OTHER PUBLICATIONS

Machine Translation for JP 2004270843 A.*

* cited by examiner

*Primary Examiner*—David P Bryant
*Assistant Examiner*—Ryan J Walters
(74) *Attorney, Agent, or Firm*—Keating & Bennett, LLP

(57) ABSTRACT

In a method of manufacturing a dynamic bearing assembly having a shaft and a sleeve whose inner circumferential surface faces an outer circumferential surface of the shaft, the shaft is inserted into a bearing hole from an upper end opening toward a bottom end opening of the bearing hole. Upon inserting the shaft into the bearing hole, fluid is fed from the bottom end opening toward the upper end opening of the bearing hole with a fluid feed apparatus.

13 Claims, 10 Drawing Sheets

METHOD OF MANUFACTURING FLUID DYNAMIC BEARING ASSEMBLY

BACKGROUND OF THE INVENTION

1. Technical Field

The present invention generally relates to methods of manufacturing a fluid dynamic bearing assembly. More particularly, the present invention generally relates to a method of manufacturing a fluid dynamic bearing assembly to enable the bearing-assembly shaft to be inserted into the bearing hole in a sleeve without scratching the inner circumferential surface of the sleeve or the outer circumferential surface of the shaft.

2. Description of the Related Art

In manufacturing the bearing assembly including a shaft and a hollow sleeve having a bearing hole, axially penetrating the sleeve, the shaft needs to be inserted into the bearing hole from one end opening toward another end opening. To insert the shaft into the bearing hole, a conventional assembling machine of the bearing assembly, shown in FIG. 7, may be used.

As shown in FIG. 7, the conventional assembling machine includes a sleeve cradle 101 supporting the sleeve 3, a vacuum line block 102 fixing the sleeve 3 and the sleeve cradle 101 by vacuuming up, a shaft insertion guide 103 having a guide hole 103*a* leading the tip end of the shaft 4 into the bearing hole 3*a* provided on the sleeve 3.

Moreover, the sleeve cradle 101 includes a plurality of suction holes 101*a* vacuuming up and fixing the sleeve 3. The vacuum line block 102 includes a vacuum line 102*a*. In addition, an airpool portion 102 is provided between the sleeve cradle 101 and the vacuum line block 102. The vacuum line 102 is connected to a vacuum forming machine (not shown in Fig.) through a vacuum line 105 whose one end is connected to the vacuum line block 102, another end is connected to the vacuum forming machine.

The conventional assembling machine with the configuration mentioned above vaccumizes the airpool 104, the suction hole 101 a, the vacuum line 102, and the vacuum line 105, such that the sleeve 3 is aspirated and fixed to the sleeve cradle 101. Subsequently, insertion guide 103 is adjusted so as to lead the shaft 4 into the guide hole 103*a*. Under the condition, the shaft 4 is inserted into the bearing hole 3*a* through the guide hole 103*a* of the shaft insertion guide 103 (see FIG. 7A).

Upon inserting the shaft 4, a position of the shaft insertion guide 103 is adjusted by an actuator, such as a motor, to align a center axis of the guide hole 103*a* and a center axis of the bearing hole 3*a*. In order to insert the shaft 4 into the bearing hole 3*a* with the shaft insertion guide 103, the center axes of the guide hole 103*a* and the bearing hole 3*a* need to be precisely aligned. In other words, the shaft insertion guide 103 needs to be highly precisely adjusted.

On the other hand, there is a clearance between the shaft 4 and the bearing hole 3*a*, and a tip end of the shaft 4 been inserted into the bearing hole 3*a* may incline corresponding to the clearance. In order to prevent the shaft from inclining, the vibration along an X direction shown in FIG. 7*b* is applied to the vacuum line block 102 with an actuator such as a cylinder (not shown in Fig). With aligning the center axes of the shaft 4 and the bearing hole 3*a* by applying vibration along the X direction in predetermined times, the shaft 4 is inserted into the bearing hole 3*a*, and then the insertion the shaft 4 into the bearing hole 3*a* is completed (FIG. 7C).

In the conventional manufacturing method, the outer circumferential surface of the shaft 4 and the inner circumferential surface of the sleeve 3 may contact each other, which may result in scratching the member with low hardness among the shaft 4 and the sleeves 3. For instance, if the hardness of sleeve 3 is lower than the hardness of shaft 4, the inner circumferential surface of the sleeve 3 is scratched. The sleeve 3 whose inner circumferential surface is scratched may influence the performance of the bearing assembly.

BRIEF SUMMARY OF THE INVENTION

A manufacturing method of a bearing assembly according to the preferred embodiment of the present invention is generally characterized by feeding fluid between an outer circumferential surface of the shaft and an inner circumferential surface of the bearing hole while inserting the shaft into the bearing hole. The fluid flows due to the static pressure difference between inside and outside of the bearing hole.

Under the condition, with the shaft being misaligned with the center axis of the bearing hole, a clearance between the outer circumferential surface of the shaft and the inner circumferential surface of the bearing hole (between a periphery of the opening of the bearing hole and a tip end of the shaft) becomes narrower at one side than another side. Therefore, at the one side, flow speed of the fluid becomes slower and it becomes faster on another side. Based on the Bernoulli's theorem, the pressure of the fluid becomes greater at one side than that at other side, such that the shaft is pushed toward the center axis of the sleeve to cancel the pressure difference. Therefore, with holding the shaft or sleeve softly enough to be moved by the pressure difference, the center axes of the shaft and the sleeve are automatically aligned.

As mentioned above, the center axes of the shaft and the bearing hole are aligned by the pressure difference of the fluid (i.e., self-alignment) when the shaft is inserted into the bearing hole, such that the uniform clearance between the outer circumferential surface of the shaft and inner circumferential surface of the bearing hole is maintained around the shaft. As a result, it is possible to start the shaft insertion into the bearing hole without contacting each other.

The fluid is fed toward the upper end opening of the bearing hole during the shaft insertion. The fluid with predetermined pressure existing between the outer circumferential surface of the shaft and the inner circumferential surface of the sleeve prevent the shaft from contacting the sleeve. Therefore, the shaft may be inserted into the bearing hole without scratching the outer circumferential surface of the shaft and the inner circumferential surface of the sleeve.

As described above, in the manufacturing method according to the preferred embodiment of the present invention, the shaft and the sleeve are appropriately self-aligned at the beginning of the shaft insertion into the bearing hole. Moreover, during the shaft insertion, the fluid with predetermined pressure is fed toward the upper end opening of the bearing hole. As a result, the fluid exists between the shaft and the sleeve, and prevents the outer circumferential surface of the shaft from contacting the inner circumferential surface of the bearing hole.

Therefore, the shaft may be inserted into the bearing hole without scratching the outer circumferential surface of the shaft and the inner circumferential surface of the sleeve. In addition, production of the bearing assembly having predetermined performance may be facilitated.

DETAILED DESCRIPTION OF THE INVENTION

Figure 1:
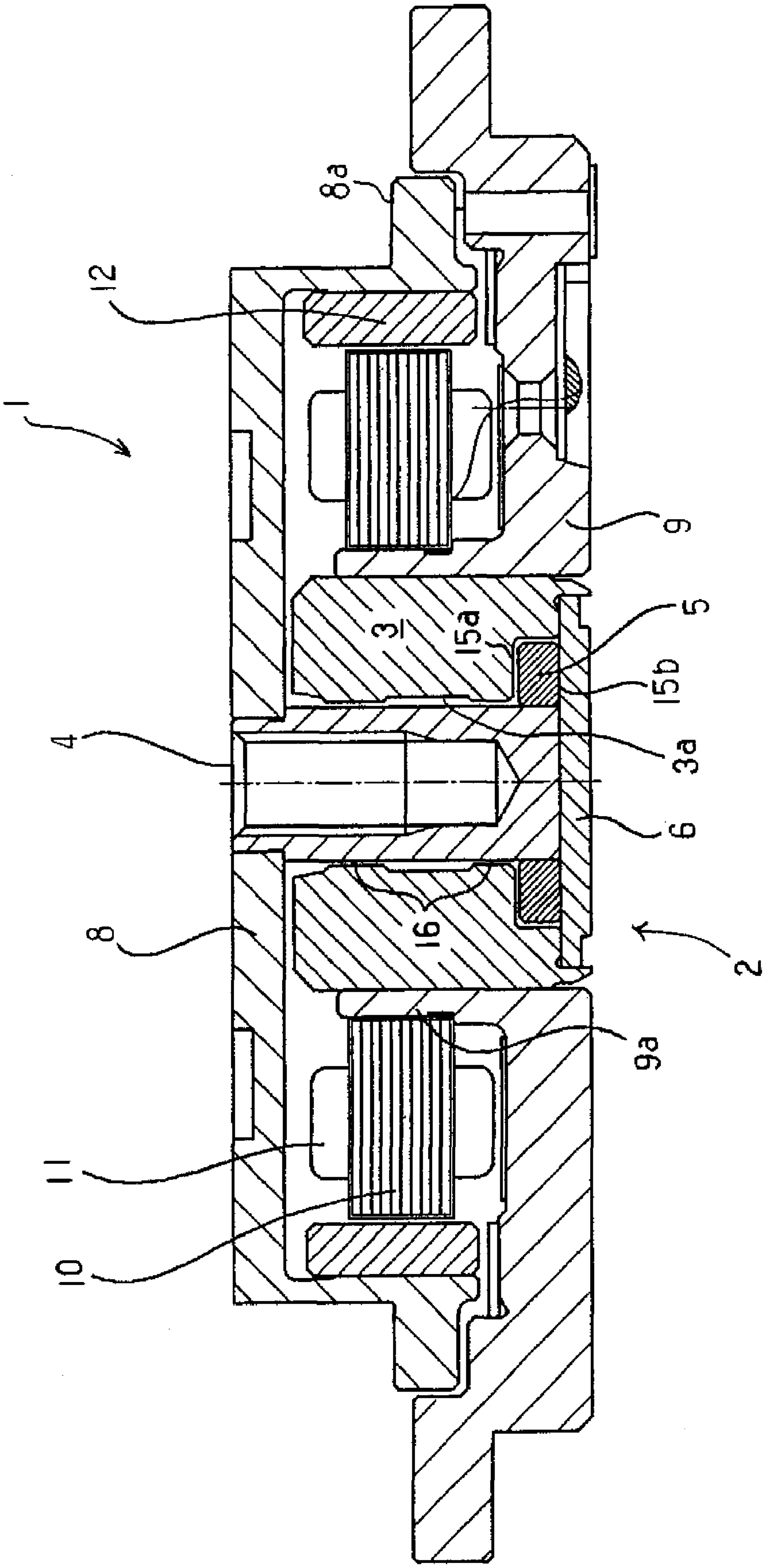
FIG. 1 is a cross sectional view showing a bearing assembly manufactured in accordance with one preferred embodiment of the present invention.

Preferred embodiments according to the present invention will be described below by referring to FIGS. 1 to 6. In the descriptions of the preferred embodiments of the present invention, words such as upper, bottom, left, and right for explaining positional relationships between respective members and directions merely indicate positional relationships and directions in the drawings. Such words do not indicate positional relationships and directions of the members mounted in an actual device.

FIG. 1 shows a bearing assembly manufactured in accordance with one preferred embodiment of the present invention. An assembling machine of the bearing assembly in accordance with the preferred embodiment of the present invention is illustrated in FIGS. 2 to 5.

FIG. 1 is a cross sectional view showing the bearing assembly manufactured in accordance with one preferred embodiment of the present invention. The bearing assembly in this preferred embodiment of the present invention is an oil dynamic bearing assembly 2 used for a spindle motor 1 driving a hard disk. The oil dynamic bearing assembly 2 includes a sleeve 3, a shaft 4, a thrust plate 5, and a counterplate 6.

For instance, the sleeve 3 is made of a copper metal array such as phosphor bronze and has a hollow cylinder shape having a bearing hole 3*a* whose inner circumferential surface faces an outer circumferential surface of the shaft 4. The shaft 4 is made of stainless steel. The shaft 4 is rotatably inserted into the bearing hole 3*a*.

A dynamic pressure surface is provided on the outer circumferential surface of the shaft 4 and on the inner circumferential surface of the sleeve 3. The dynamic pressure surfaces radially opposing each other with a gap maintained therebetween forms a radial dynamic bearing portion 16. In this preferred embodiment, two radial dynamic bearing portions 16 are provided in an axially distanced manner. A clearance between the inner circumferential surface of the sleeve 3 and the outer circumferential surface of the shaft 4 at the radial dynamic bearing portion is about 3 pm to about 6 pm. At least each gap of the dynamic bearing portion 16 is filled with a lubricant fluid such as lubricant oil and ferrofluid. In addition, a radial dynamic pressure generating groove having such as a herringbone shape is formed at the dynamic bearing surface (not shown in Fig.).

The thrust plate 5 has a ring shape and is fixed to a bottom end portion of the shaft 4 by such as press fitting. The thrust plate 5 is arranged within a cylinder convex portion of the sleeve 4 caving inwardly from the bottom end surface of the sleeve 4 at around the center axis of the sleeve 4. The counterplate 6 has a disk shape having larger diameter than that of the thrust plate 5, and is arranged so as to adjoin and face the bottom end surface of the thrust plate 5. The counterplate 6 is fixed to the sleeve 3 and occludes a bottom end opening of the sleeve 3.

An upper surface of the thrust plate 5 and a counter surface of the sleeve 3 facing the upper surface of the thrust plate 5 include dynamic pressure surfaces. These dynamic pressure surfaces axially facing each other constitute a thrust dynamic bearing portion 15*a*. Similarly, the dynamic pressure surfaces are provided on the bottom surface of the thrust plate 5 and a surface of the counterplate 6 facing the bottom surface of the thrust plate 5. These dynamic pressure surfaces axially facing each other constitute a thrust dynamic bearing portion 15*b*. At least each gap provided at the thrust dynamic bearing portion is filled with the lubricant fluid such as lubricant oil and ferrofluid.

A rotor hub 8 having a substantially cup shape is fixed to the upper tip end portion of the shaft 4 by such as press fitting. The rotor hub 8 includes a disk placing surface 8*a*, and a recording disk is placed thereto. Moreover, an annular rotor magnet 12 is attached to the rotor hub 8.

As explained above, the oil dynamic bearing assembly 2 is used for the spindle motor 1 to rotary drive a hard disk. The spindle motor 1 includes a fixed frame 9. At a substantially middle portion of the fixed frame 9, a bearing holder 9*a* having a hollow cylinder body portion is arranged in a standing condition. The sleeve 3 is fixed to an inner side of the bearing holder 9*a* by such as the press fitting, shrinkage fitting, and bonding. To an outer side of the bearing holder 9*a*, a stator core 10 constituted by a laminated body of electrical steel is attached. The stator core 10 includes a plurality of teeth portion, and a coil 11 is wound around each of the teeth portion. The rotor magnet 12 and the coil 11 constitute an actuator portion of the spindle motor 1.

Figure 2:
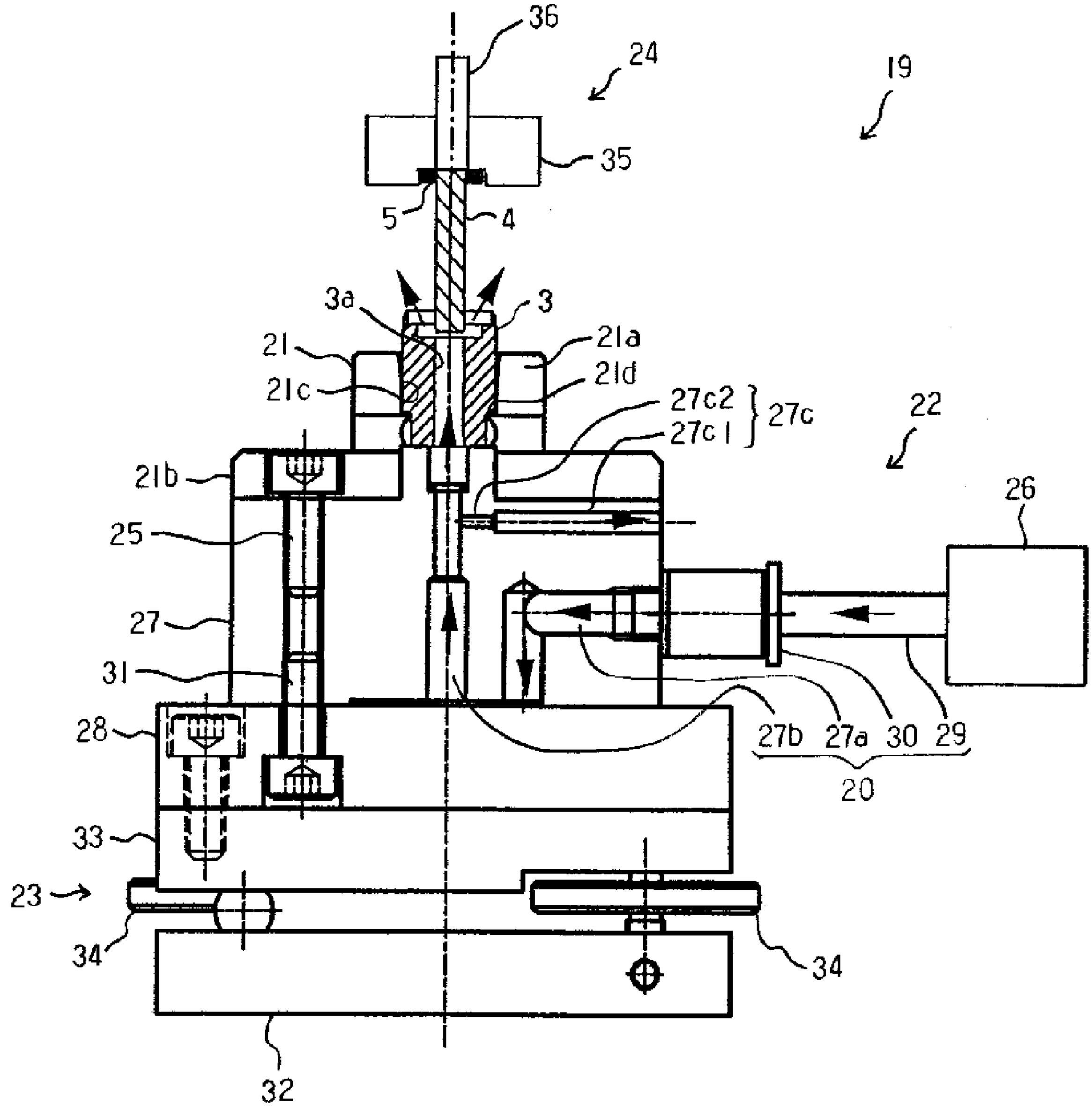
FIG. 2 is a cross sectional view showing an assembling machine in accordance with one preferred embodiment of the present invention.

FIG. 2 is a cross sectional view showing an assembling machine of the bearing assembly according to one preferred embodiment of the present invention. An assembling machine 19 according to this preferred embodiment of the present invention assembles the bearing assembly 2 by inserting the shaft 4 from the upper end opening toward the bottom end opening of the bearing hole 3*a* of the sleeve 3. The assembling machine 2 includes a sleeve cradle 21, fluid feed apparatus 22, a positioning portion 23, and a shaft support portion 24. The sleeve cradle 21 supports the sleeve 3 so as to axially arrange the bearing hole 3*a* of the sleeve 3. The sleeve cradle 21 includes a sleeve support portion 21*a* retaining the sleeve 3, and an attaching portion 21*b* being fixed to the fluid feed apparatus 22.

The sleeve support portion 21*a* having a hollow cylinder shape includes a sleeve insert hole 21*c* axially penetrating the sleeve 3 along the center axis thereof. The sleeve insert hole 21*c* includes a step portion 1*d* for the axial positioning of the sleeve 3 upon inserting the sleeve 3 into the sleeve insert hole 21*c*. An inner diameter of the sleeve insert hole 21*a* is slightly larger than an outer diameter of the sleeve 3. By virtue of the configuration, an inner circumferential surface of the sleeve insert hole 21*c* and an outer circumferential surface of the sleeve 3 face each other with a gap radially maintained therebetween when the sleeve 3 is inserted and retained in the sleeve support portion 21*a*.

The attaching portion 21*b* having flange shape is formed at the bottom side of the sleeve cradle 21. By fixing the attaching portion 21*b* to a first fluid channel block 27 constituting the fluid feed apparatus 22 with a screw 25, the sleeve cradle 21 is fixed to the fluid feed apparatus 22.

The fluid feed apparatus 22 feeds fluid from the bottom end opening toward the upper end opening of the bearing hole 3*a* of the sleeve retained on the sleeve cradle 21.

The fluid feed apparatus 22 includes a pump 26, the first fluid channel block 27, a second fluid channel block 28, a pipe 29, and a coupling 30. The pump 26 is used as a fluid pressurizing device to send the fluid with a predetermined pressure. The first fluid channel block 27 includes a fluid passing hole 27*a* and a fluid passing hole 27*b* which supply the fluid pumped out from the pump 26 to the bearing hole 3*a* of the sleeve 3 retained on the sleeve cradle 21. The second fluid channel block 28 includes a fluid pool (not shown in Figs.) provided between the fluid channel holes 27*a* and 27*b*. The piping 29 and coupling 30 connect the first fluid channel block 27 and the pump 26.

In this preferred embodiment of the present invention, air is used as fluid. However, the fluid is not limited to the air, and any suitable substance such as gas other than air, water, and alcohol may be used as the fluid. For instance, upon using the liquid as a fluid, isopropyl alcohol may be suitable to the fluid in the view of its drying property and the cost. However, in this preferred embodiment of the present invention, in which the shaft 4 is inserted into the bearing hole 3*a* by the self-weight of the shaft 4 as mentioned later, it is preferable to use air as the fluid.

The fluid channel hole 27*a* is formed so that the fluid pumped out from the pump 26 inflows thereto through the pipe 29 and the coupling 30, and then outflows to the fluid pool (not shown in Fig.) provided to the second fluid channel block 28. Similarly, the fluid channel hole 27*b* is formed so that the fluid outflowing from the fluid pool flows into the fluid channel hole 27*b* and outflows toward the bearing hole 3*a*. Thus, a fluid channel 20 which connects the pump 26 and the bearing hole 3*a* is constituted by the pipe 29, the coupling 30, and the fluid channel holes 27*a* and 27*b*.

An air outlet portion of the fluid channel 20 may be preferably connected to the bottom opening of the bearing hole in a coaxial manner so that the fluid smoothly flows into the bearing hole 3*a*.

The first fluid block 27 includes a bypass passage 27*c*. The bypass passage 27*c* exhausts the fluid from the fluid channel 20 to maintain predetermined fluid pressure within the bearing hole 3*a* upon inserting the shaft 4 into the bearing hole 3*a* of the sleeve 3.

The bypass passage 27*c* includes a first bypass passage 27*c*1 and a second bypass passage 27*c*2.

The second bypass passage 27*c*2 has smaller diameter than the first bypass passage 27*c*1 and the fluid passage hole 27, and connects the first bypass passage 27*c*1 and the fluid passing hole 27. The first bypass passage 27*c*1 extends to an outside of the first fluid block 27. Whereby, the bypass passage 27*c* exhausting the fluid from the fluid channel hole 27*b* is provided. The relation between fluid pressures in bearing hole 3*a* and the second bypass passage hole 27*c*2 is described later.

The second fluid channel block 28 is fixed to the first fluid channel block 27 by a screw 31. To facilitate the processing of the fluid channel holes 27*a* and 27*b*, the fluid channel block may be dividend into the first and second fluid channel blocks 27 and 28, and then, these blocks 27 and 28 may be fixed each other by screw 31 after processing them. Alternatively, the fluid channel block may be solely constituted by the first fluid channel block 27 to which the fluid channel hole 27*a* and 27*b* are continuously formed.

The positioning portion 23 adjusts an incline of the center axis of the sleeve 3 retained to the sleeve cradle 21. The positioning portion 23 includes a base 32, an adjustment stand 33, and a plurality of screws 34 connecting the adjustment stand 33 to the base 32.

The shaft support portion 24 leads the shaft 4 into the bearing hole 3*a*. The shaft support portion 24 includes a shaft support member 35 which retains the shaft 4 so as to lead the shaft 4 into the bearing hole 3*a* and a vacuum pipe 36 which vacuums up and fixes the shaft 4 to the shaft support member 35.

The shaft support member 35 includes a shaft supporting hole which retains the shaft 4 having the thrust plate 5 fixed thereto. The shaft support member 35 may move in axial (vertical) direction with the actuator such as the cylinder (not shown in Figs.). The vacuum pipe 36 is connected to a vacuuming unit (not shown in Figs) vacuuming up the shaft 4 to fix it to the shaft supporting member 35.

Referring to FIGS. 2 to 5, the steps of inserting the shaft 4 into the bearing hole 3*a* on the sleeve 3 from one end opening (the upper opening) toward another end opening (bottom end opening) are described in detail.

Figure 3:
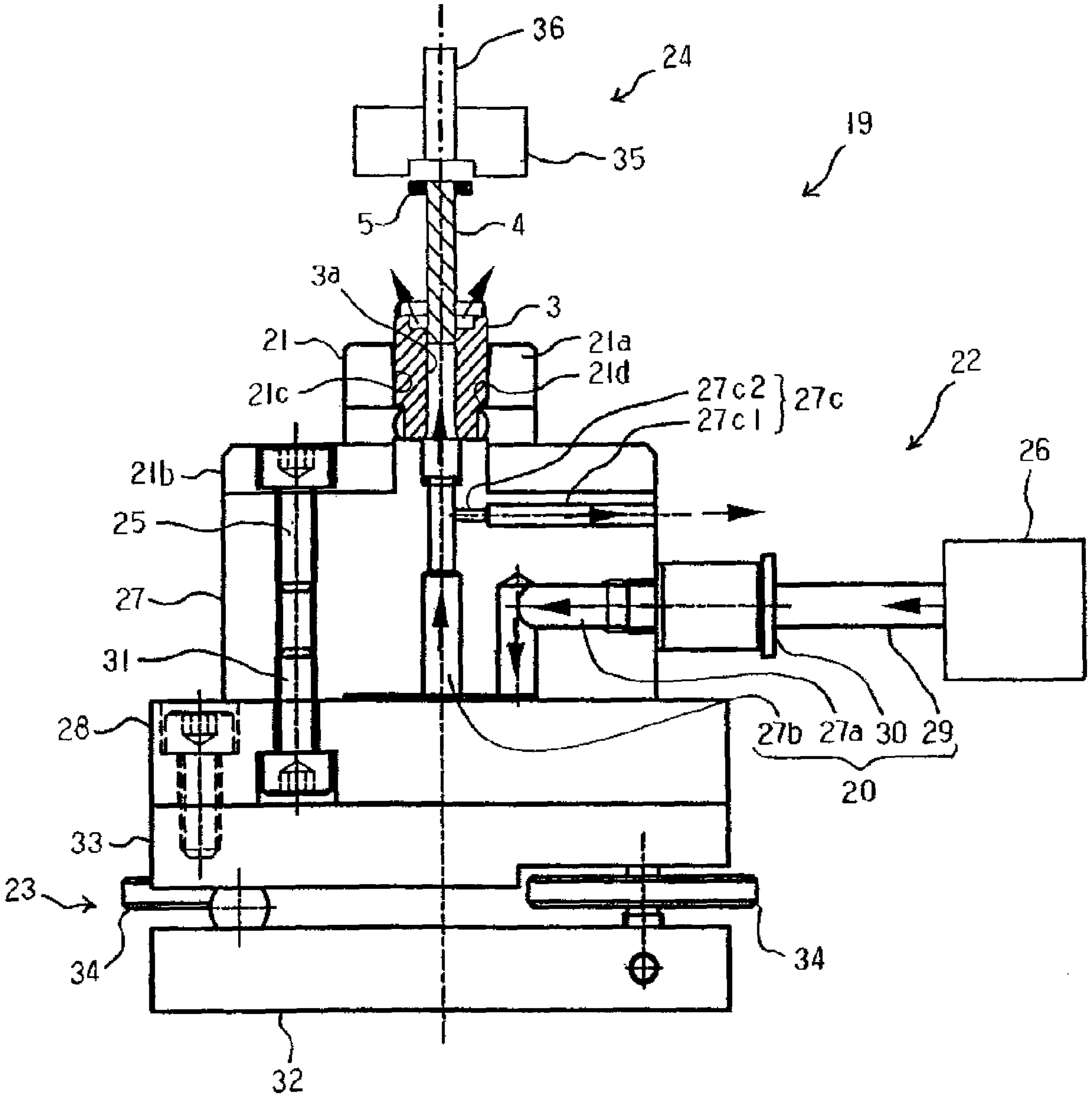
FIG. 3 is a cross-sectional view of the assembling machine shown in FIG. 2 in the middle state of inserting a shaft into a bearing hole.

FIG. 3 is a cross-sectional view of the assembling machine 19 shown in FIG. 2 in the state of inserting the shaft 4 into the bearing hole 3*a*. FIG. 4 is a drawing explaining the principle of self-alignment of the shaft 4 upon the initial state of the shaft 4 insertion into the bearing hole 3*a*. FIG. 5 is drawing explaining the interaction between the shaft 4 and the bearing hole 3*a* during the shaft 4 insertion into the bearing hole 3*a*.

Firstly, as shown in FIG. 2, the sleeve 3 is inserted into the sleeve insert hole 21 and retained with aligning the bearing hole 3*a* of the sleeve 3 with the axial direction. The sleeve 3 is axially positioned with a step portion 21*d*. The incline of the sleeve 3 against the central axis may be adjusted with the screw 34. The sleeve 3 is retained with a gap radially maintained between the sleeve 3 and the inner surface of the sleeve insertion hole 21*c*. The shaft 4, to which the thrust plate 5 is fixed by, for example, press fitting, is vacuumed up and fixed to the shaft support portion 24.

The fluid with the predetermined pressure is fed from the bottom end opening to the upper end opening of the bearing hole 3*a* via the fluid channel 20 constituted by such as the fluid passing holes 27*a* and 27*b*.

Under the condition, an actuator (not shown in Figs) moves the shaft 4 into the downward direction, to begin the shaft 4 insertion into the bearing hole 3*a*.

Figure 4A:
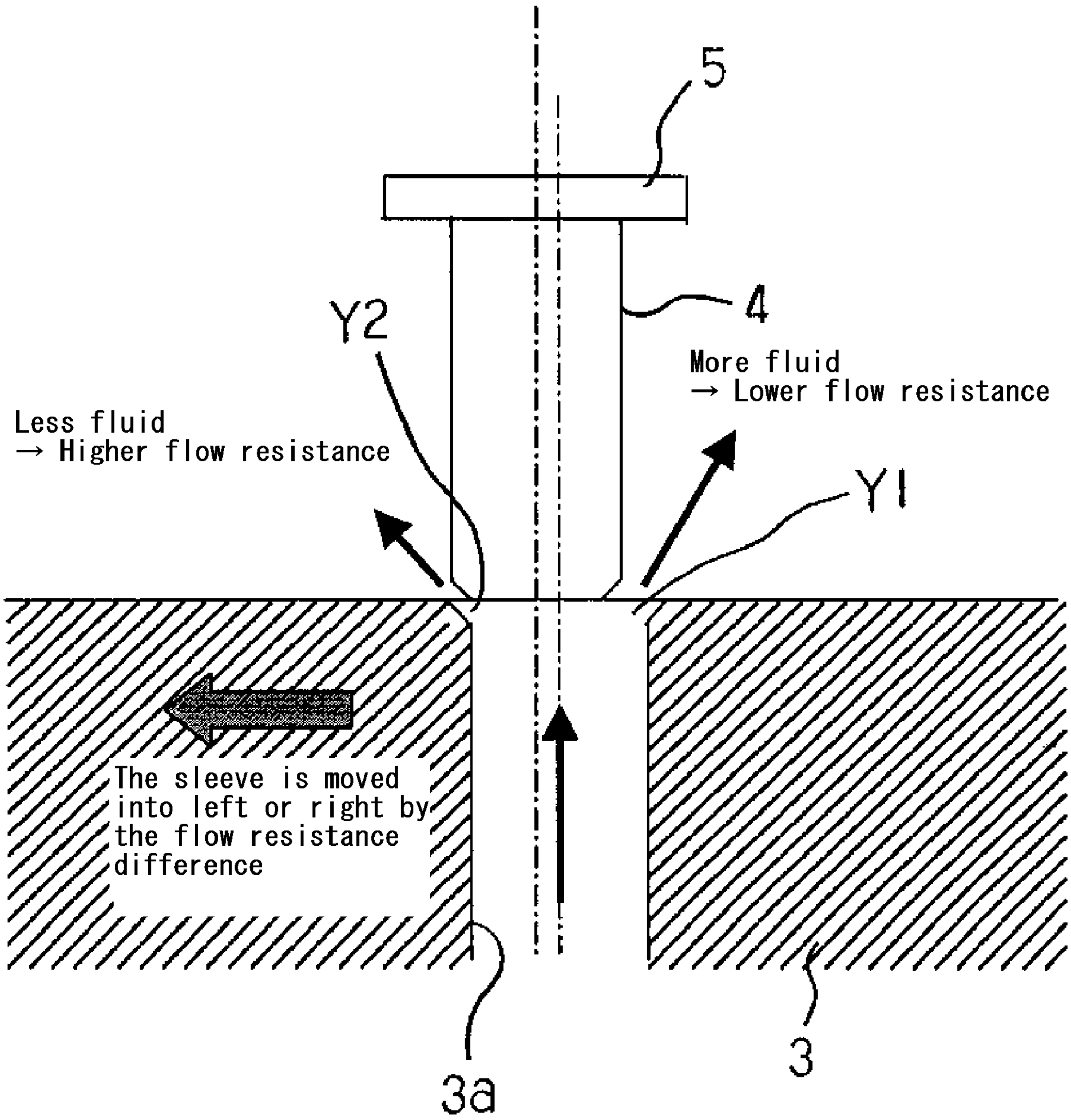
FIGS. 4A and 4B are drawings explaining the principle of self-alignment of the shaft upon the beginning of the shaft insertion into the bearing hole.
Figure 5:
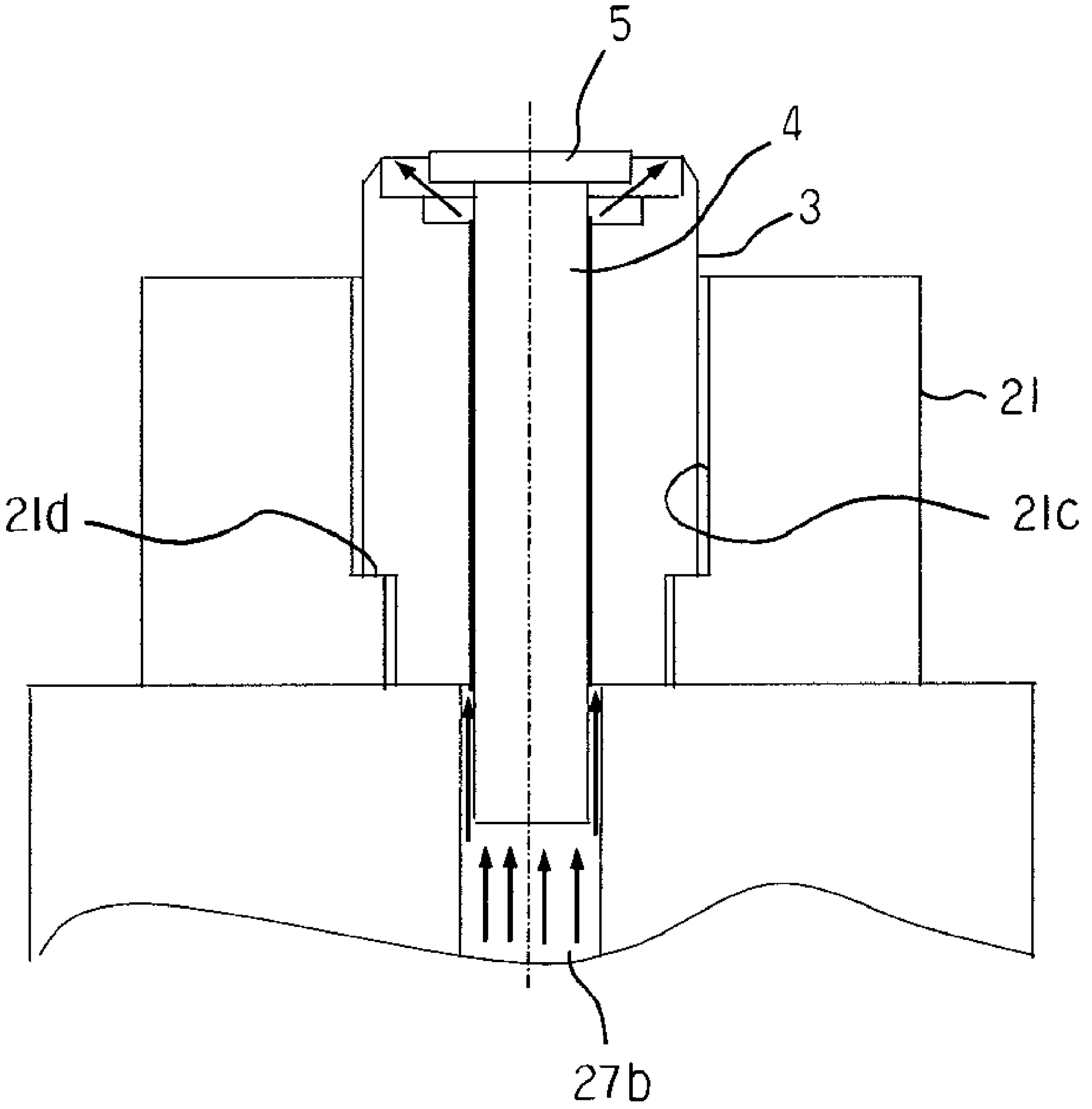
FIG. 5 is drawing explaining the interaction between the shaft and the bearing hole during the shaft insertion into the bearing hole.

Upon beginning of the shaft 4 insertion into the bearing hole 3, the center axis misalignment between the shaft 4 and the bearing hole 3 generates the flow resistance difference at the upper end opening of the bearing hole 3 as shown in FIG. 4A. For instance, when the center axis of the shaft 4 misaligns to the left side against that of the bearing hole 3*a* as shown in FIG. 4A, a wide gap Y1 and a narrow gap Y2 are defined with the shaft 4 and the upper end opening of the bearing hole 3*a*. The diameter difference of the gaps makes the amount of the fluid flowing into the gap different. More fluid flows into the wide gap Y1, and less fluid flows into the narrow gap Y2. In other words, the flow resistance at the narrow gap Y2 is higher than that at the wide gap Y1.

Figure 4B:
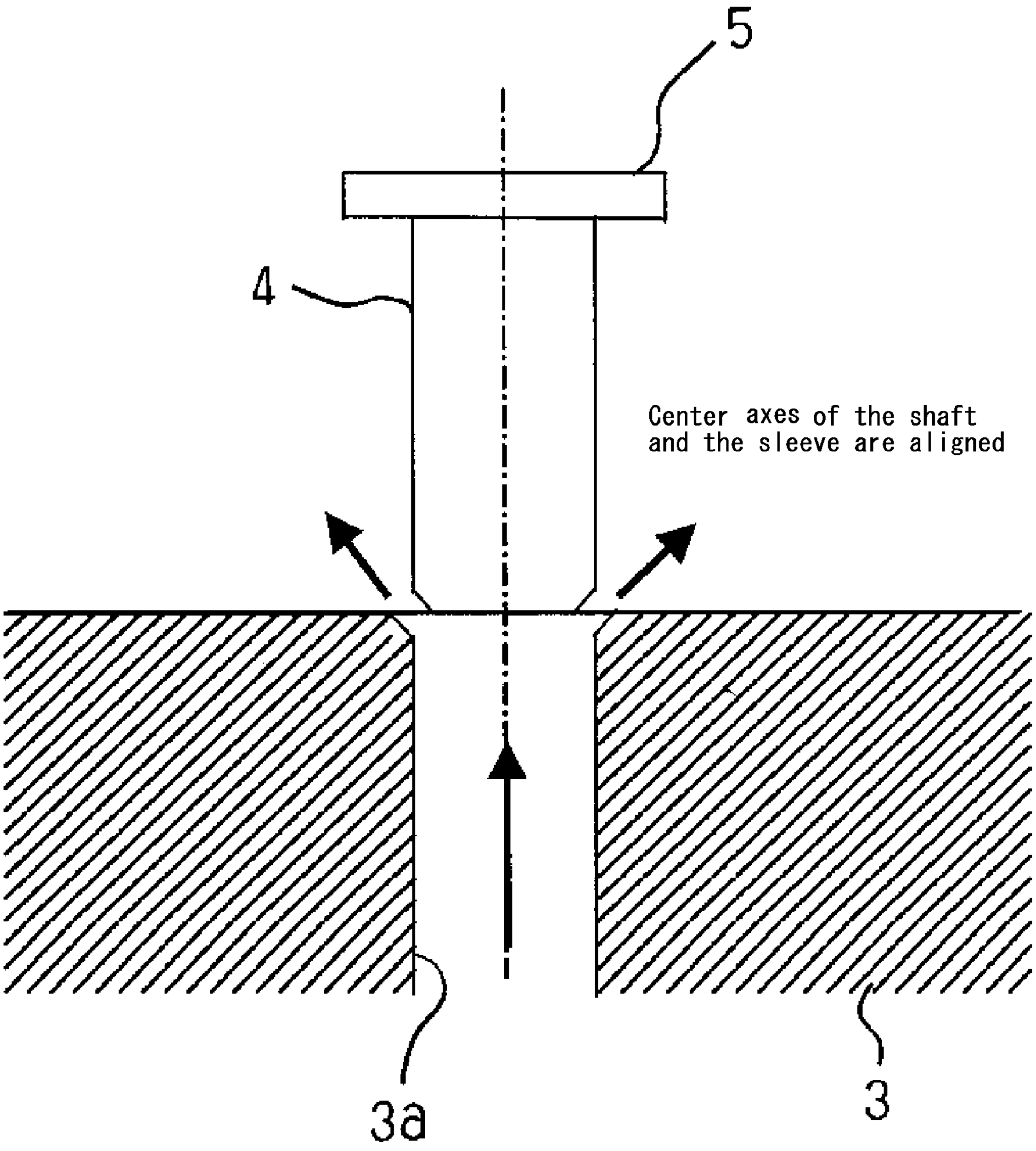

The sleeve 3 is supported with a gap radially maintained between the sleeve 3 and the sleeve insert hole 21*c*, such that the sleeve 3 may laterally move to cancel the flow resistance difference. In other words, the sleeve 3 may radially move so as to balance the flow resistance (amount of the fluid flowing around the shaft 4) around the shaft 4. As a result, the center axes of the shaft 4 and the bearing hole 3*a* are self-aligned as shown in FIG. 4B.

When the center axes of the shaft 4 and the bearing hole 3*a* are aligned, the shaft 4 is released from the shaft support portion by stopping the vacuuming up. The pressure of the fluid fed from the pump 26 is adjusted so that the shaft 24 enters into the bearing hole 3*a* by its self-weight. Therefore, the shaft 4 released from the shaft support member 24 slowly enters into the bearing hole with being self-aligned (see FIG. 3).

Upon the completion of the shaft 4 insertion into the bearing hole, the fluid feed from the pump 26 is stopped, and the sleeve 3 with the shaft 4 inserted therein is released from the sleeve cradle 21. Then, the counterplate 6 is attached and fixed to the sleeve 4.

During the shaft 4 insertion into the bearing hole 3*a*, the pump 26 feeds the fluid with the predetermined pressure from the bottom end opening toward the upper end opening of the bearing hole 3*a*. As a result, the fluid with the predetermined pressure exists within the gap defined with the outer circumferential surface of the shaft 4 and the inner circumferential surface of the sleeve 3, such that the substantially uniform clearance is maintained therebetween.

By the way, as the shaft 4 is inserted into the bearing hole 3*a*, the axial length of the portion where the outer circumferential surface of the shaft 4 faces the inner circumferential surface of the sleeve 3 becomes longer. In other words, the passage in which the fluid flows from the bottom end opening to the upper end opening becomes narrower as the shaft 4 is inserted into the bearing hole 3*a*. As a result, the fluid resistance increases more as the shaft 4 is inserted into the bearing hole 3*a*, therefore, the fluid pressure within the bearing hole 3*a* increases as well.

Once the pressure within the bearing hole exceeds the threshold point, the shaft 4 may be pushed into the opposing direction from the shaft insertion direction (upward direction in this preferred embodiment), which is so called "shaft jumping". As a result of the shaft jumping, the inner circumferential surface of the sleeve 3 may varies and the shaft 4 and the sleeve 3 may contact.

In order to prevent the shaft jumping, the fluid is exhausted from the fluid passing hole 27*b* via the bypass passage 27*c* before the fluid pressure exceeds the threshold point. The diameter of the second bypass passage hole 27*c*2 is smaller than that of the first bypass passage hole 27*c*1 and the fluid passage hole 27*b*. The diameter of the second bypass passage hole 27*c*2 is determined depending on such as the weight of the shaft 4, the fluid pressure, the diameters of the first bypass passage hole 27*c*1 or the fluid passage hole 27*b*.

As mentioned above, in this preferred embodiment, the fluid feed apparatus 22 feeds the fluid from the bottom end opening toward the upper end opening of the bearing hole 3*a* to which the shaft 4 is inserted. By use of the pressure of the fluid fed to the bearing hole 3*a*, the shaft 4 is self-aligned with the bearing hole 3*a* upon the beginning of the shaft 4 insertion into the bearing hole 3*a*. Therefore the uniform clearance between the outer circumferential surface of the shaft 4 and the inner circumferential surface of the bearing hole 3*a* is maintained. As a result, the shaft 4 insertion into the bearing hole 3*a* may begin without contacting each other.

During the shaft 4 insertion process into the bearing hole 3*a*, the fluid is fed toward the upper end opening of the bearing hole 3*a*, which may prevent the shaft 4 from contacting the inner circumferential surface of the sleeve 3. Therefore, the shaft 4 may be inserted into the bearing hole 3*a* without scratching the outer circumferential surface of the shaft 4 and the inner circumferential surface of the sleeve 3.

In addition, by virtue of the bypass passage 27*c*, the fluid pressure within the bearing hole 3*a* may be maintained appropriately. Therefore, the occurrence of the shaft jumping may be inhibited, such that the shaft 4 may be inserted into the bearing hole 3*a* without scratching the outer circumferential surface of the shaft 4 and the inner circumferential surface of the sleeve 3.

Moreover, in the assembling of the oil dynamic bearing assembly 2, the shaft 4 is aligned with the bearing hole 3*a* of the sleeve 3 and is inserted into the bearing hole 3*a* by the self-weight of the shaft 4.

Therefore, it is not necessary to use the driving source (actuator) to insert the shaft 4 into the bearing hole 3*a*. Without applying the external force generated by the actuator, the self-alignment of the shaft 4 and the bearing hole 3*a* may be facilitated, and the gap (clearance) between the outer circumferential surface of the shaft 4 and the inner circumferential surface of the sleeve 3 may be maintained uniformly. Using the actuator to insert the shaft into the bearing hole, it is necessary to determine how much force is applied to the shaft and how to hold the shaft to align the shaft and the bearing hole. However, in the preferred embodiment of the present invention, the self-alignment of the shaft and the bearing hole facilitated without considering above factors.

Moreover, by using air as the fluid, the assembling machine may be built at lower cost, comparing with the machine using other than air as the fluid. As a result, the bearing assembly may be manufactured at low cost.

With referring to FIG. 6, another preferred embodiment of present invention is described below.

The preferred embodiment of the present invention is applicable to the assembling machine inserting the shaft 4, having the rotor hub 8 fixed thereto, into the bearing hole 3*a*. In this case, however, the sleeve 3 with the shaft 4 inserted thereto can not be detached from the sleeve cradle 21 into the upward direction.

Figure 6:
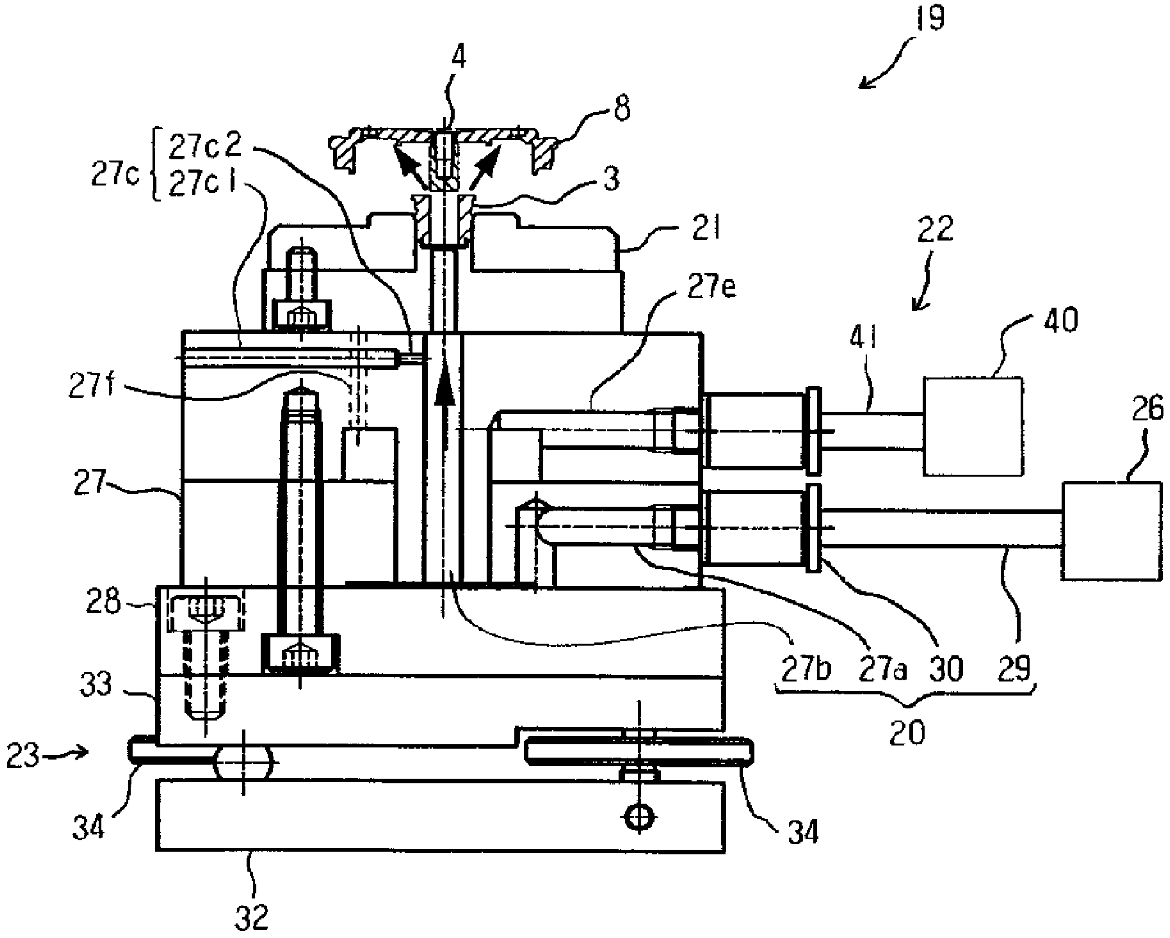
FIG. 6 is a cross sectional view showing an assembling machine of the bearing assembly according to another preferred embodiment of the present invention.
Figure 7A:
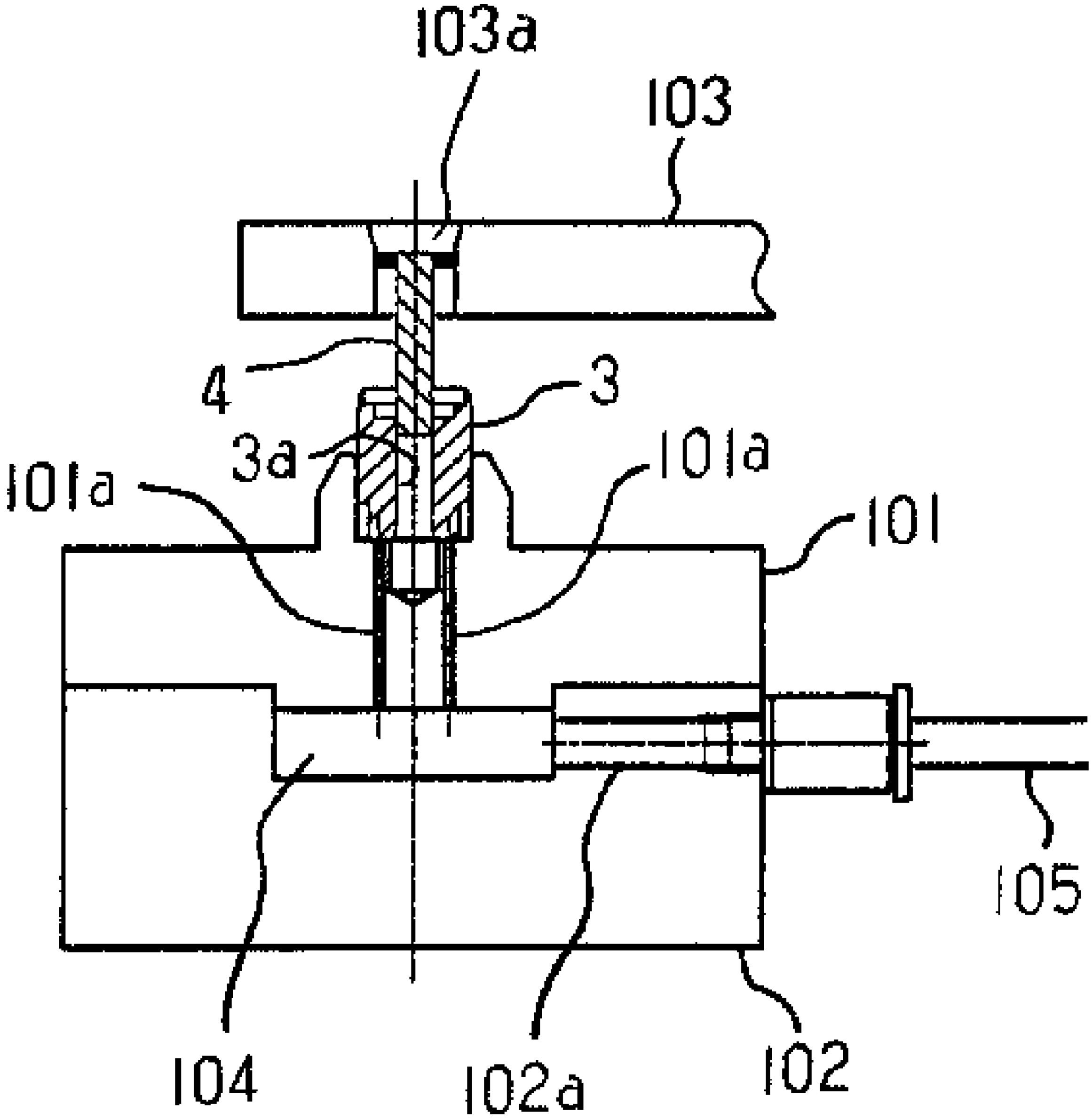
FIG. 7A is a cross sectional view showing a conventional assembling machine of the bearing assembly.
Figure 7B:
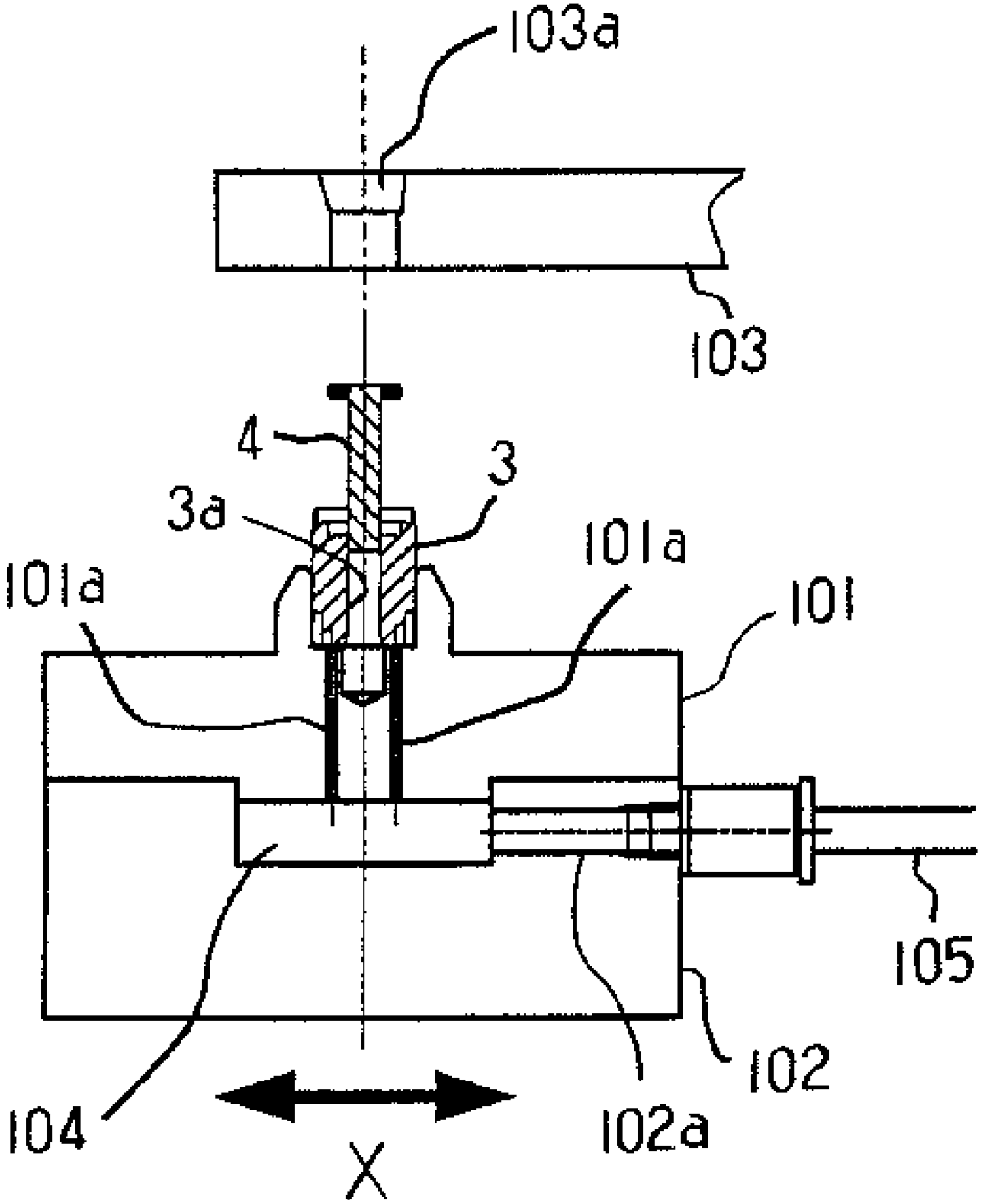
FIG. 7B is a cross sectional view showing a conventional assembling machine of the bearing assembly.
Figure 7C:
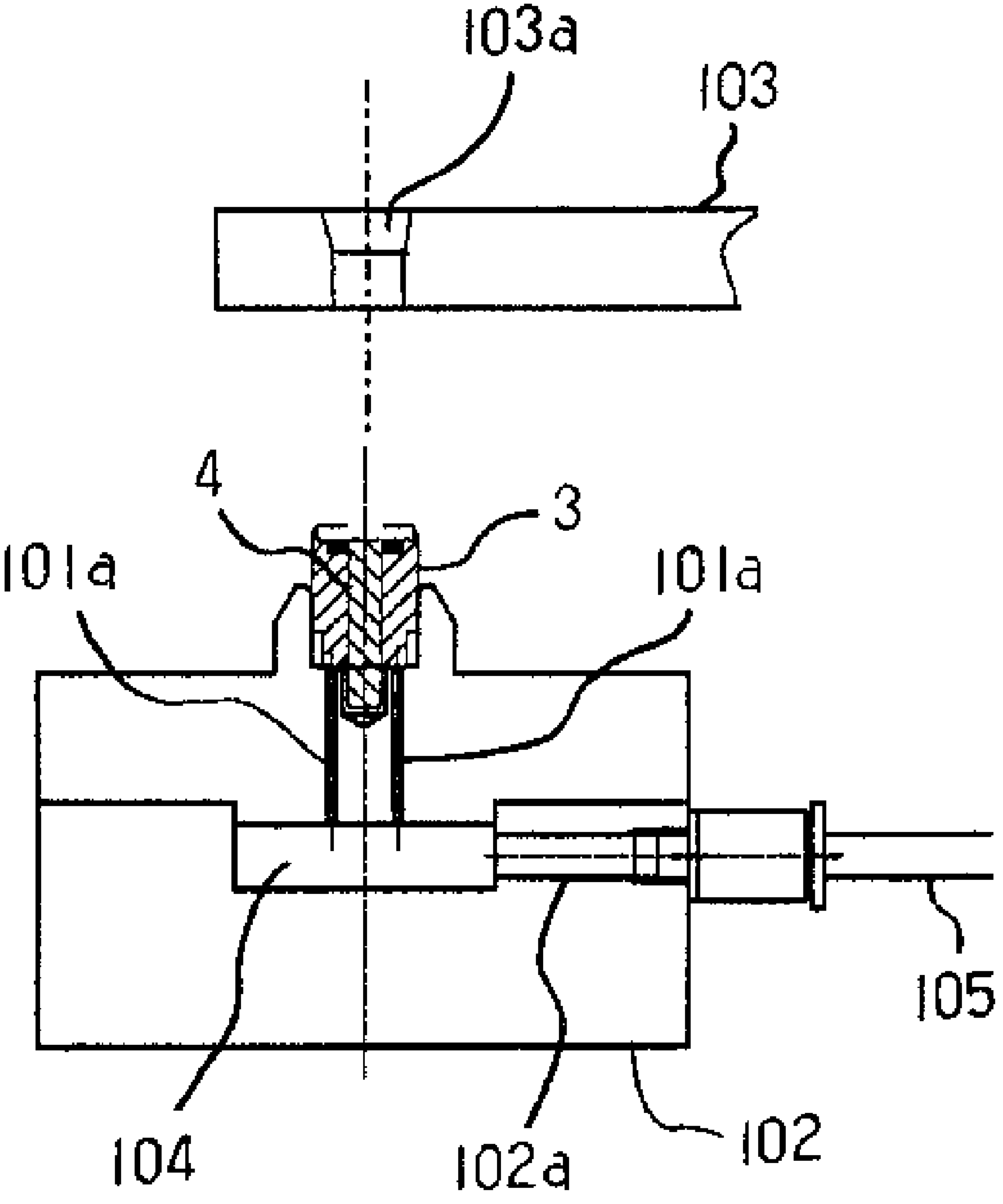
FIG. 7C is a cross sectional view showing a conventional assembling machine of the bearing assembly.

Consequently, in the assembling machine shown in FIG. 6, the sleeve cradle 21 is retained on the first fluid channel block 27 by a vacuuming portion. The vacuuming portion includes a vacuum forming portion 40, a vacuum pipe 41, and a vacuum pipe hole 27*e* and a suction hole 27*f* provided on the first fluid channel block 27.

By virtue of the configuration mentioned above, the sleeve cradle 21 may be detached by terminating the vacuum forming portion 40. Therefore, the sleeve cradle 21 may be easily detached from the first fluid channel block 27. Then, by vertically flipping the sleeve cradle 21 detached form the first fluid channel block 27, the sleeve 3 may be detached from the sleeve cradle 21.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

For instance, upon the beginning of the insertion of the shaft 4 into the bearing hole 3*a*, the sleeve 3 may be fixed and the shaft 4 may be laterally moved to align the center axes of them.

For instance, the shaft 4 may be inserted into the bearing hole 3*a* by the self-weight of the sleeve 3.

For instance, with horizontally aligning the center axes of the shaft 4 and the sleeve 3, the shaft 4 may be inserted into the bearing hole 3*a* by the actuator. In this case, it is necessary to determine how much force the actuator applies on shaft 4 to align the center axes of the shaft 4 and the bearing hole 3*a* and how to hold the shaft 4 to insert the shaft 4 into the bearing hole 3*a*.

In the preferred embodiments of the present invention, the bearing assembly is the oil dynamic bearing assembly 2. However, the bearing assembly may be other than the oil dynamic bearing assembly, it may be such as gas dynamic bearing assembly.

The bearing assembly may be any bearing assembly as long as it includes the shaft and the hollowed sleeve having the bearing hole whose inner circumferential surface faces the outer circumferential surface of the shaft.

What is claimed is:

1. A manufacturing method of a dynamic bearing assembly including a shaft and a sleeve including a bearing hole along a center axis thereof, comprising:

inserting the shaft into the sleeve from an upper end of the sleeve, and moving the shaft into the bearing hole of the sleeve while a fluid is exhausted from an upper end opening of the bearing hole by feeding the fluid into the bearing hole from a bottom end opening of the bearing hole with a fluid feed apparatus, wherein a center axis of the shaft is substantially aligned with a center axis of the bearing hole before the shaft is inserted into the sleeve during the inserting step, and the inserting step is performed such that the shaft is freed from a shaft support portion after the center axis of the shaft is aligned with the center axis of the bearing hole such that the shaft drops into the bearing hole due to self-weight of the shaft.

2. The manufacturing method as set forth in claim 1, wherein a center axis of the shaft is substantially aligned with a center axis of the bearing hole upon beginning to insert the shaft into the sleeve.

3. The manufacturing method as set forth in claim 2, wherein the sleeve is supported in a sleeve insert hole provided on a sleeve cradle with a gap radially maintained therebetween, and the sleeve is moved in a radial direction so that the center axis of the shaft is substantially aligned with the center axis of the bearing hole upon beginning to insert the shaft into the sleeve.

4. The manufacturing method as set forth in claim 1, wherein an amount of the fluid per unit time exhausted from the upper end opening is reduced by controlling the pressure within the bearing hole when the shaft is positioned adjacent to the upper end opening.

5. The manufacturing method as set forth in claim 1, wherein the fluid feed apparatus includes a bypass passage which is connected to an area including a pressure that is less than a pressure present at a bottom end opening of the bearing hole.

6. The manufacturing method as set forth in claim 5, wherein the fluid feed apparatus includes a fluid channel connected to the bottom end opening of the bearing hole, and the fluid is fed to the bottom end opening via the fluid channel.

7. The manufacturing method as set forth in claim 6, wherein an air outlet portion of the fluid channel connected to the bottom end opening extends in an axial direction and is substantially coaxial with the center axis of the bearing hole.

8. The manufacturing method as set forth in claim 6, wherein:

the fluid feed apparatus includes the bypass passage which is connected to the area; and a portion of the fluid is exhausted to the area to adjust the pressure within the bearing hole while the shaft is inserted into the bearing hole.

9. The manufacturing method as set forth in claim 6, wherein:

the fluid feed apparatus includes a pump; and the fluid pumped out from the pump is fed to the bottom end opening via the fluid channel.

10. The manufacturing method as set forth in claim 1 wherein:

the fluid feed apparatus includes a pump pumping out the fluid and a fluid channel connecting the pump and the bottom end opening of the bearing hole; and the fluid pumped out from the pump is fed to the bottom end opening via the fluid channel.

11. The manufacturing method as set forth in claim 1, wherein the fluid is gas.

12. The manufacturing method as set forth in claim 1, wherein the fluid is liquid.

13. The manufacturing method as set forth in claim 1, further comprising the steps of:

temporarily connecting the shaft to the shaft support portion; and using the shaft support portion to position the shaft relative to the sleeve.

* * * * *